United States Patent Office 3,012,858
Patented Dec. 12, 1961

3,012,858
PROCESS FOR PREPARING CHROMIUM HEXACARBONYL
Irving Wender, Pittsburgh, Pa., assignor to Diamond Alkali Company, Cleveland, Ohio, a corporation of Delaware
No Drawing. Filed Nov. 26, 1958, Ser. No. 776,413
9 Claims. (Cl. 23—203)

This invention relates to a new and improved process of preparing chromium hexacarbonyl.

Chromium hexacarbonyl, i.e., $Cr(CO)_6$, has previously been prepared by the reaction of chromium chloride with phenyl magnesium bromide in the presence of carbon monoxide. However, the yields have been undesirably low, e.g., the preparation reported in the text "Inorganic Syntheses," by E. McCrary (1950), page 156. More recently, the preparation of chromium carbonyl by reaction at superatmospheric pressure of a reducing metal higher than platinum in the electromotive series, a chromium compound, and a source of iodine in a Grignard-type aliphatic solvent is described in U.S. Patent No. 2,803,525, Brimm et al., via the reaction:

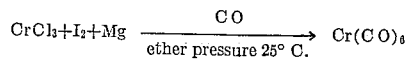

$$CrCl_3+I_2+Mg \xrightarrow[\text{ether pressure 25° C.}]{CO} Cr(CO)_6$$

The present invention constitutes an improvement over the Brimm et al. method whereby singularly improved high yields of chromium hexacarbonyl are obtained.

Briefly, the present invention comprises a method of preparing chromium hexacarbonyl by reacting together in the presence of hydrogen, at a superatmospheric pressure, carbon monoxide, a chromium compound, iodine, whether added as such or generated in situ, a reducing metal and an oxygen-containing compound, preferably an oxygen-containing solvent. The specific improvement of the present invention comprises carrying out the reaction at super-atmospheric pressure in the presence of hydrogen, e.g., in a hydrogen atmosphere. It has been found that the reaction yields are surprisingly and substantially increased by conducting the reaction in the presence of controlled amounts of hydrogen.

In carrying out the present process, there are combined in a pressure resistant reaction vessel, e.g., an autoclave provided with an agitator and temperature control means, a mixture of a "reducing metal," which term as used in the specification and calims is intended to include the metals magnesium, aluminum, zinc, copper, silver and manganese, and a trivalent chromium halide compound selected from the group consisting of chromium iodide, chromium chloride and chromium bromide, preferably chromium chloride, iodine being added when the mixture does not also include chromium iodide; the iodine may otherwise be introduced as free iodine, magnesium iodide, aluminum iodide or zinc iodide. The foregoing materials are preferably mixed in a neutral, oxygenated organic Grignard-type solvent such as ethyl ether, tetrahydrofuran, dimethylether of diethylene glycol, methyl ethyl ketone or acetone, ethyl ether at present being preferred. Into this mixture are introduced carbon monoxide and hydrogen, the ensuing reaction being conducted at superatmospheric pressure of at least 100 lbs. p.s.i.g. and preferably at a pressure greater than 800 p.s.i.g.

Generally, the amount of hydrogen introduced is regulated by introducing sufficient hydrogen to increase the pressure within the reactor from about 5 to 50 p.s.i.g., preferably about 20 to 40 p.s.i.g., in addition to the pressure of carbon monoxide, the overall gas pressure being controlled to be above 100 lbs. p.s.ig. and preferably about 800 lbs. p.s.i.g., a specifically preferred total reaction pressure being about 900 p.s.i.g. Pressures substantially greater than about 900 p.s.ig. are not required to achieve high yields in accordance with the practice of this invention.

The reaction temperature advantageously may be room temperature, or lower, if desired, there being no apparent advantage to operating at high temperatures with the attendant difficulties imposed by the use of such temperatures. However, typically practicable reaction temperatures are within the range from about 0° to 100° C., preferably about room temperature (25° C.). In many instances, a small temperature rise from about 25° C. to 40° or 50° C. is observed due to the exothermic nature of the reaction.

When reaction is complete, which is generally evidenced by a drop in the reactor pressure corresponding to the utilization of carbon monoxide during the reaction, e.g., a 100 to 200 p.s.i.g. drop being typical, the chromium carbonyl product can be separated in any suitable way, as by steam distillation or sublimation. The chromium hexacarbonyl product is useful as an intermediate or as a starting material in the preparation of various chromium compounds including different chrome organic compounds. In addition, the chromium carbonyl advantageously can be used to plate chromium metal onto metal surfaces by thermal decomposition of the carbonyl.

The mechanism by which the high yields of the present invention are achieved is not understood at the present time. However, it has been found that the presence of a small controlled amount of hydrogen during the reaction substantially greater than any which might be found in commercially available carbon monoxide effects a surprising improvement in yield over the previously known processes for producing chromium hexacarbonyl.

The proportions of the reactants may be varied somewhat. However, it is generally desired to employ substantially stoichiometric proportions of carbon monoxide and the chromium compound, preferably chromium chloride, i.e., at least about 6 mols CO/mol of $CrCl_3$, and with sufficient quantities of iodine, e.g., at least 1 mol of $I_2$/mol of $CrCl_3$, whether added as such or generated in situ, and sufficient reducing metal to effect the desired reaction. The carbon monoxide is introduced by providing a carbon monoxide atmosphere in the reaction chamber and further by providing vigorous agitation of the reactants throughout the reaction. It has been found that the vigorous agitation is essential in achieving a high yield although agitation without the addition of a small amount of hydrogen in accordance with this invention is not sufficient to lead to the desired high yields.

In order that those skilled in the art may more completely understand the present invention and the preferred methods by which the same may be carried into effect, the following specific examples are offered.

Example 1

Into a magnetically agitated autoclave [1] ("The Magno Dash") as described in Bulletin 1051–B of Autoclave Engineers, Inc., Erie, Pennsylvania, are introduced 16 g. chromium trichloride, 14 g. iodine, 10 g. magnesium and 200 ml. ethyl ether. The reaction vessel is then purged with nitrogen and carbon monoxide. At this time, a trace of hydrogen is charged to pressurize the autoclave with 30 p.s.i.g. of hydrogen, followed by charging the reaction vessel with carbon monoxide to a total pressure of 950 p.s.i.g. The reaction is then allowed to run overnight with continuous vigorous agitation at a pressure varying between 775 and 950 p.s.i.g., the temperature varying between 18° and 30° C. The reaction vessel is then vented and the reaction product is mixed with a 1 normal solution of HCl. This mixture is then steam distilled to obtain 19.36 g. of chromium

[1] U.S. Patents 2,631,091 and 2,661,938.

hexacarbonyl which after washing with 50 ml. methyl alcohol comprises an 87.5% yield.

Example 2

Using the apparatus and general procedure of the foregoing example, there are introduced to the autoclave, 16.0 g. chromium chloride, 14.0 g. iodine, 10.0 g. magnesium and 200 ml. of ethyl ether, the reactor previously being flushed with 10 ml. of ethyl ether and purged with nitrogen and carbon monoxide. Hydrogen is introduced into the reactor to a pressure of 30 p.s.i.g. Agitation is then started and carbon monoxide is introduced to obtain a total pressure of 900 p.s.i.g. Reaction is continued for a total of 24 hours with high speed agitation. There results, after working up the product as in the preceding example, a yield of chromium hexacarbonyl of 18.25 g. or 82.2%.

Example 3

To illustrate the improvement in yield effected by use of a small amount of hydrogen, the preceding example is repeated, using the same source of carbon monoxide and introducing into the reactor 16 g. chromium chloride, 10 g. magnesium, 14 g. iodine and 200 ml. of ethyl ether but omitting the introduction of hydrogen. Reaction is continued for 24 hours at a pressure varying between 690 and 825 p.s.i.g. of carbon monoxide and at temperature varying between 37° and 45° C.

By this procedure the yield is only 50.9% of chromium hexacarbonyl.

Example 4

Following the general procedure of Example 1 of U.S. Patent No. 2,803,525, Brimm et al., but doubling the quantities, there are combined in a magnetically-agitated autoclave 16.0 g. chromium chloride, 14.0 g. iodine, 10.0 g. magnesium and 200 ml. of ethyl ether, the reactants being continuously agitated during the reaction, there initially being a purging with nitrogen and introduction of hydrogen by filling the reaction chamber with hydrogen at a pressure of 30 p.s.i.g. and immediately thereafter introducing sufficient carbon monoxide to produce the desired total pressure. Using this procedure with continuous agitation of reactants, reaction is carried out for a total of 23 hours at a pressure varying between 900 and 950 lbs. p.s.i.g. and at a temperature within the range from 23° to 43° C.

The reaction products are mixed with a 1 normal solution of HCl and the resultant acid mixture is steam distilled. There is obtained by this procedure 19.05 g. of chromium hexacarbonyl comprising an 86% yield. Thus, using substantially the same procedure of Example 1 of U.S. Patent No. 2,803,525, Brimm et al., but adding hydrogen in accordance with the present invention, there is obtained a singular increase in product yield.

While it has been found that a trace amount of hydrogen is necessary to effect the desired substantial increase in the product yield, somewhat larger amounts of hydrogen can be used, e.g., by pressurizing the reaction vessel with hydrogen to a pressure of about 5 to 50 p.s.i.g. However, if the hydrogen pressure and/or concentration is substantially in excess of about 70 p.s.i.g., it is found that the chromium hexacarbonyl yield is reduced. Thus, the use of hydrogen is a critical feature of the present invention and the hydrogen concentration, as measured by hydrogen pressure, also is critical in that an excess of hydrogen tends to reduce the product yield.

It is to be understood that although the invention has been described with specific reference to particular embodiments thereof, it is not to be so limited, since changes and alterations therein may be made which are within the full intended scope of this invention as defined by the appended claims.

What is claimed is:

1. In the process for preparing chromium hexacarbonyl by chemically reacting carbon monoxide, a trivalent chromium compound, iodine and a reducing metal, the improvement which comprises carrying out the reaction by vigorously agitating the reaction mixture at a pressure of at least 800 p.s.i.g., said pressure including about 5 to 50 p.s.i.g. of initially charged hydrogen.

2. A process according to claim 1 wherein there is also present an oxygen-containing solvent.

3. The process for preparing chromium hexacarbonyl which comprises reacting together carbon monoxide, a trivalent chromium compound, iodine and a reducing metal in the presence of an oxygen-containing solvent, the reaction being carried out with vigorous agitation and at a superatmospheric pressure of at least 800 p.s.i.g. including about 5 to 70 p.s.i.g. initially-charged hydrogen.

4. The process according to claim 3 wherein the hydrogen is introduced prior to pressurization of the reaction vessel with carbon monoxide.

5. The process of producing chromium hexacarbonyl which comprises combining in a reactor a chromium compound, a source of iodine, a reducing metal and an oxygen-containing solvent, purging the reactor with an inert gas, filling the reaction vessel with hydrogen to an initial pressure of about 5 to 50 p.s.i.g. and pressurizing the reaction vessel with carbon monoxide to a pressure of at least 800 p.s.i.g. and carrying out the reaction with vigorous agitation of the reactants.

6. The method according to claim 5 wherein the trivalent chromium compound is chromium trichloride.

7. The method of producing chromium hexacarbonyl in high yield which comprises introducing into a reactor equipped to withstand superatmospheric pressure and provided with means for agitation of the reactants, chromium trichloride, iodine, a reducing metal and an oxygen-containing solvent, purging the reactor with an inert gas, filling the reaction container with hydrogen to an initial pressure of about 20 to 40 p.s.i.g. and subsequently pressurizing the reactor with carbon monoxide to a pressure of at least 800 p.s.i.g. and carrying out the desired reaction at superatmospheric pressure and vigorously agitating the reactants at a temperature within the range from about 20° C. to an exothermically achieved temperature without external heating and subsequently separating chromium hexacarbonyl.

8. The process according to claim 7 wherein the chromium hexacarbonyl is separated by steam distillation.

9. The process according to claim 7 wherein the reducing metal is magnesium and the oxygen-containing solvent is ethyl ether.

References Cited in the file of this patent

UNITED STATES PATENTS

| | | |
|---|---|---|
| 2,477,553 | McKeever | July 26, 1949 |
| 2,803,525 | Brimm et al. | Aug. 20, 1957 |